July 3, 1956 — E. E. DODGE — 2,752,995
TIME RELEASED ANIMAL FEEDER
Filed June 7, 1954
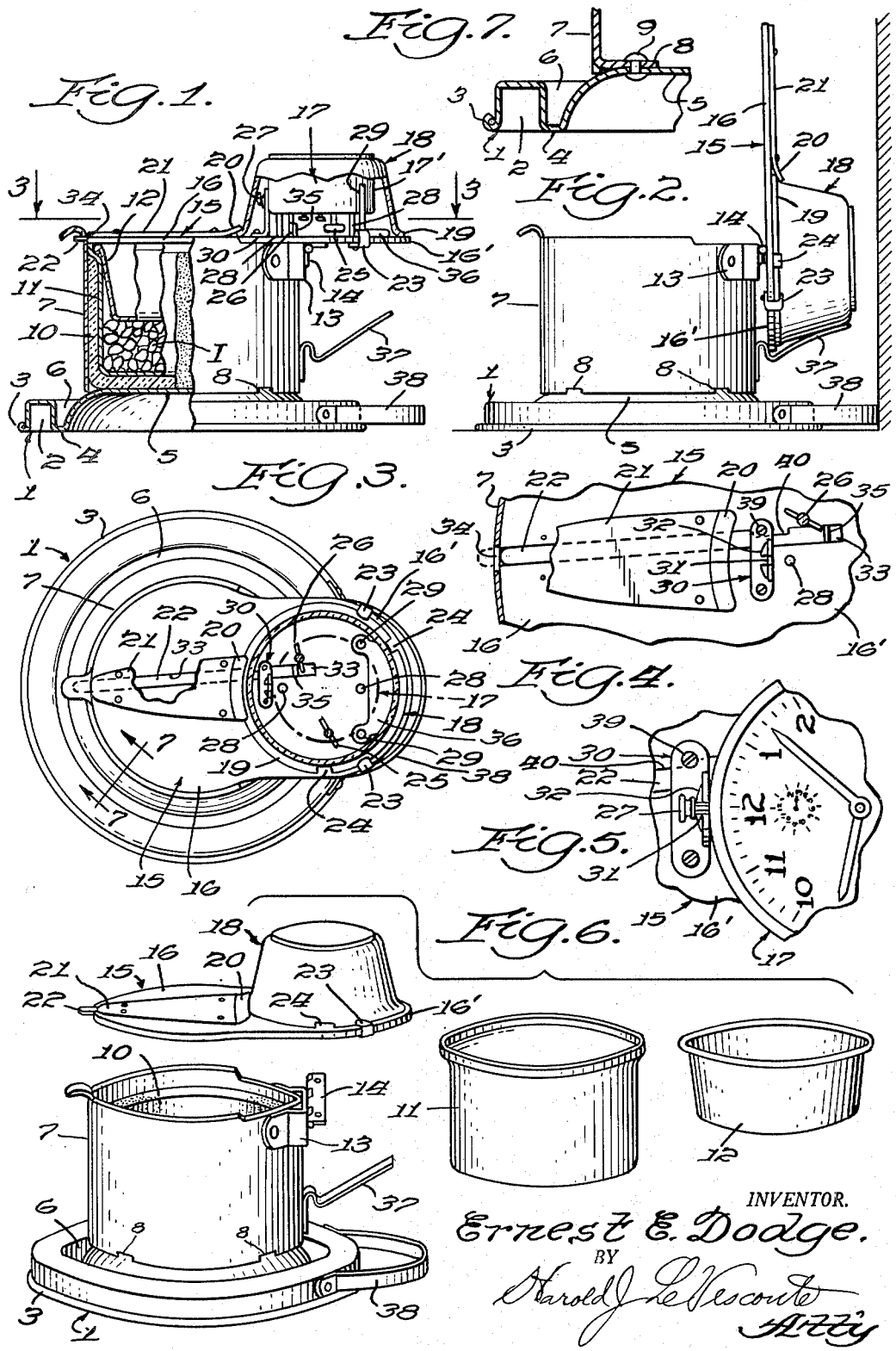
INVENTOR.
Ernest E. Dodge.
BY Harold J. LeVescoute
Atty

2,752,995

United States Patent Office

Patented July 3, 1956

2,752,995
TIME RELEASED ANIMAL FEEDER
Ernest E. Dodge, Glendale, Calif.

Application June 7, 1954, Serial No. 434,950

4 Claims. (Cl. 161—10)

This invention relates to pet feeding devices and more particularly to an improved form thereof which can be set to expose the food at a given time and which includes means by which the food so placed in the device is maintained in good condition and free from invasion by insects, particularly by ants.

The principal object of the invention is to provide a feeder for pets which includes a clockwork device which can be set to expose the food for consumption at a predetermined time.

Another object of the invention is to provide a feeder for pets which may be thus pre-set to open and expose the food and which includes means for maintaining the food under refrigeration to prevent spoilage.

Still another object of the invention is to provide a pet feeding device of the above character which includes means by which the contained food is protected from invasion by ants and like insects.

A further object of the invention is to provide a pet feeding device in which the timing mechanism for opening the food compartment serves to secure the food compartment locking means against dislodgement until operated to effect the unlocking thereof.

A still further object of the invention is to provide a timed pet feeding device which is so constructed and arranged that the possibility of failure to open the means for actuating the unlocking means incidental to arranging the device for use is precluded.

Still another object of the invention is to provide a pet feeding device of the above character which is formed principally from standard articles of commerce available on the open market, which is simple in construction, economical to manufacture, and reliable in use.

With the foregoing objects in view, together with such additional objects and advantages as may subsequently appear, the invention resides in the parts, and in the construction, combination and arrangement of parts disclosed, by way of example, in the following specification of a satisfactory mode of execution of the invention; reference being had to the accompanying drawings which form a part of said specification and in which drawings:

Fig. 1 is a side elevation of a pet feeder embodying the present invention; a portion of the device being shown in section to disclose interior construction and the device being shown in closed position and just starting to be opened by the timing mechanism, Fig. 2 is a side elevation of the device and showing it in open position, Fig. 3 is an enlarged top plan sectional view taken on the line 3—3 of Fig. 1 showing details of the locking and unlocking means; the parts being shown in locked position prior to the unlocking action, Fig. 4 is an enlarged, fragmentary, top plan view showing details of the unlocking mechanism, Fig. 5 is a fragmentary top plan view showing details of the means for preventing failure to set the timing means in operative position, Fig. 6 is an exploded view of the principal components of the device, and Fig. 7 is a fragmentary sectional view taken on the line 7—7 of Fig. 3 showing a detail of construction.

Referring to the drawings, the illustrated embodiment of the device comprises a base 1 which may conveniently be formed of a pie pan having a peripheral drippings receiving trough 2 formed therein. In the present invention, this pan is inverted so that the base rests on the rim 3 and the ridge 4 which normally combines with the rim to form the trough 2. The device is mounted on the bottom portion 5 of the inverted pan and the portion 6 immediately inwardly adjacent the trough forms a circular trough or moat which can be filled with water to prevent ants or other crawling insects from reaching the device from the ground.

Mounted on the portion 5 of the base is the outer wall 7 of the food container; said outer wall comprising in the present invention, a strip of sheet metal bent into circular form and having a series of inwardly laterally extending ear portions 8 which are secured to the portion 5 by rivets 9 (see Fig. 7). The inner face and bottom of the cavity formed by the wall 7 and bottom element 5 is lined with heat insulating material 10 which, preferably, is readily removable and replaceable, and removably fitting within this cavity is an ice containing pan 11. A food containing pan 12 fits within the pan 11 and is of less depth with resultant provision of a space between the pans 11 and 12 for a quantity of ice or other refrigerant material I.

Mounted adjacent the top edge of the outer wall member 7 is a bracket 13 to which is secured one leaf of a hinge 14, the other leaf of the hinge being secured to the under side of a cover element 15. The cover element 15 is preferably formed from plywood or other thin rigid material having good insulating properties and comprises a forward portion 16 fitting within the periphery of the wall member 7 and resting, when closed, on the top rim of the pan 12 (see Fig. 1), and a rear portion 16' which extends beyond the hinge 14 and carries the timing mechanism including an alarm clock 17 of common design and a detachable transparent cover element 18 housing the clock and formed from a standard form of molded plastic dish used in inverted position; said dish having an outwardly flared rim 19 engageable beneath the upwardly flared end 20 of the keeper element 21 for the locking bolt 22 and beneath the locking lug elements 23, 23 carried by the cover element portion 16 adjacent the outer end thereof; the rim 19 of the cover element 18 having notches 24, 24 formed therein whereby the rim may first be inserted under the end 20 of the keeper element 21 with the notches 24, 24 positioned to pass the lugs 23, 23 and then moved down against the cover element portion 16 and rotated sufficiently to move the notches 24, 24 out of registry with the lugs 23, 23 (see Fig. 3).

The clock 17 is a standard alarm clock having a shallow cylindrical case 17' having a face and hands at the front thereof and the winding keys 25 and 26 for the clock work and alarm mechanisms, respectively, projecting from the rear thereof. The arming means comprises a plunger 27 for activating and deactivating the alarm mechanism projecting from the top of the clock case 17'.

The clock is placed in face up position on the portion 16' of the cover element 15 and is supported thereon by two short pins 28, 28 projecting upwardly therefrom sufficiently so that the keys 25 and 26 are clear of the top surface of the cover element. The clock is held against lateral movement by two pins 29, 29 arising from the cover element near the distal end of the portion 16' thereof and a member 30 fixed to the cover element and engaging the side of the case 17' which normally is the top of the clock and through which the plunger 27 extends. The member 30 is provided with a slot 31 in its upper edge which engages the plunger and with a cam face 32 bordering the slot on the side of the member opposite that engaged by the clock; said cam face being effective on placing the clock in position on the pins 28, 28 to draw the plunger 27 outwardly with resultant opening of the alarm mechanism. Thus, the clock when placed in position on the device automatically has the alarm mechanism released for operation at the set time. The cover element 15 is provided with a wide shallow groove 33 extending longitudinally of the upper surface thereof from the distal end of the portion 16 thereof to a point slightly past and to one side of the shank of the alarm winding key 26; said slot being covered by the keeper element 21 and combining therewith to form a guideway for the locking bolt 22. The locking bolt comprises a strip of metal and when projected to the left as viewed in Figs. 2 and 3, the end of the bolt engages a slot 34 in the wall 7 to lock the cover element in closed position. The opposite end of the bolt 22 terminates in a vertical portion 35 closely adjacent to one side of and slightly in rear of the stem of the alarm winding key 26 (see Fig. 3) and when the device is put into use the alarm key is wound to a position wherein one wing of the key is in rear of the portion 35 thus holding the bolt against displacement. When the alarm is activated at the set time the key rotates in a counterclockwise direction as viewed in top plan and the opposite wing of the key engages the front face of the member 35 and thus moves the bolt rearwardly to the position shown in Fig. 4 releasing the bolt and unlocking the cover.

The position of the clock and its cover on the cover element relative to its hinge mounting is insufficient alone to effect the opening movement of the cover element. To provide for this counterweight action, the cover element is provided with sufficient additional weight adjacent the distal end of the portion 16' thereof to combine with the weight of the clock and its cover to move the cover element to open position upon release of the latch means. In the illustrated embodiment of the invention this added weight comprises a fishing sinker 36 having holes in each end thereof which engage the pins 29, 29. Preferably, the thus added weight, when added to the weight of the clock and its cover is sufficient to effect the desired extent of unbalance. However if it should be insufficient, smaller added weights such as washers may be placed on one or both of the pins 29, 29 until the desired action is achieved. The objective is to so adjust this weight that the user need only to place the clock and its cover on the cover element incident to placing the device in use to insure that the cover 16 will open when released.

To check the opening movement of the cover element, the outer wall of the member 7 is provided with a spring arm 37 preferably so positioned with respect to the arc described by the distal end of the portion 16' of the cover element 15 that it forms a chord of said arc. Consequently, as the end of the end of the cover element swings downwardly incident to opening of the device, it will engage this spring arm with gradually increasing force until it reaches the midpoint of said arc and will engage the spring arm with gradually decreasing force until at the end of the opening movement, the arm engages the sidewall of the clock cover. The object is to effect the stopping of this movement without such shock as might prove harmful to the clock mechanism. Another advantage of this means for checking the opening movement of the cover element is that it holds the cover in open position when the device is being cleaned or being made ready for the next use. To prevent the device from being placed in such close proximity to a wall or the like which might interfere with the opening of the device, the base member 1 is provided with a laterally extending loop 38 disposed beneath the path of movement of the downwardly moving portion of the cover element and extending outwardly from the base a sufficient distance to insure against interference with the free action of the cover element.

In use, the pan 11 is first filled to the desired extent with the refrigerant (usually household ice cubes) and the pan 12 is filled with the desired amount of food and is placed in the pan 11. The clock and its cover having previously been removed, the cover element is moved to closed position and the bolt 22 is moved forwardly into the slot 34 as far as the screw 39, which serves to secure the member 30 to the cover element 15 and which engages a notch 40 in the side of the bolt, will allow. The clock is then wound and set as to time and the alarm is wound and set for the time at which the device is to open. The clock is then positioned on the cover element and its cover element 18 positioned over it and the device is ready to open itself at the desired time. In this connection, it is especially to be noted that the clock carrying portion of the lid when in open position is disposed in a substantially vertical position closely adjacent to the side of the food container thus affording access by the animal to the food from all sides of the container except that side to which the cover is hinged and that in this position the lid additionally protects the clock and other devices carried by the lid from being soiled by food splashed or thrown by the feeding animal. Where necessary, the moat 6 is filled with water to prevent access to the food by ants and the like. After use, the pans 11 and 12 may be removed for cleaning and replacement for the next use.

It is particularly to be noted that the above-described embodiment of the invention is in large measure constructed from standard articles of commerce to be readily found on the open market. This advantage reduces both the cost of tooling and manufacture with the resultant economical selling price. It is not, however, to be inferred from the foregoing specification that the device cannot be equally well constructed from parts specially designed therefor if such parts shall be found to be desirable as, for example, where quantity production is concerned. Moreover, the construction is both sturdy and simple and the device is readily kept in sanitary condition. Further, the provision for refrigeration enables perishable foods to be placed in the device without danger of spoilage over longer periods of time than would be possible without this feature.

While the foregoing specification discloses one mode of execution of the invention, it is appreciated that in the light of such disclosure, modifications will suggest themselves to others. Therefore, the invention is not deemed to be limited to the exact details of the form thereof above described by way of example, but it will be understood that the invention includes as well all such modifications and changes in the parts, and in the construction, combination and arrangement of parts as shall come within the purview of the appended claims.

I claim:

1. A feeding device for dispensing food to domestic pets at a pre-selected time including in combination a food compartment having an open top, a lid hingedly connected to the rearward upper edge of said compartment and including a compartment closing portion and another portion extending from said hinged mounting in the opposite rearward direction from said compartment closing portion, a bolt slidably mounted on said lid for engagement and disengagement with means on said compartment effective when engaged to hold said lid in compartment closed position, a clock detachably mounted on said last named portion of said lid, devices actuated by said clock for moving said bolt to disengaged position at a preselected time, and a cover element detachably mounted on said lid and housing said clock; said clock and said cover combining to serve in part as counterweight means effective upon disengagement of said bolt with said bolt engaging means on said compartment to move said lid on said hinged mounting from a horizontal compartment closing position to a near vertical open position.

2. A feeding device for dispensing food to domestic pets at a pre-determined time including in combination a food compartment having an open top, a lid hingedly connected to the rearward upper edge of said compartment and including a compartment closing portion and another portion extending from said hinged mounting in the opposite rearward direction from said compartment closing portion, a bolt slidably mounted on said lid for engagement and disengagement with means on said compartment effective when engaged to hold said lid in compartment closing position, a clock detachably mounted on the upper face of said last named portion of said lid with the back of said clock faced toward said lid, means on said lid holding said clock spaced from said lid, mechanism in said clock for disengaging said bolt from said means on said compartment at a pre-selected time including an operating spring, a winding key projecting from the back of said clock and an arming element, and a member carried by said bolt and disposed in the path of rotation of said winding key incident to activation of said clock mechanism effective to cause said rotation of said key to move said bolt to disengaged position, said clock additionally serving as part of a counterweight means effective upon disengagement of said bolt from said means on said compartment to move said lid to open position.

3. A feeding device for dispensing food to domestic pets at a pre-selected time including in combination a food compartment having an open top, a lid hingedly connected to the upper edge of said compartment and including a compartment closing portion and another portion extending from said hinged mounting in the rearward opposite direction from said compartment closing portion, a bolt slidably mounted on said lid for engagement and disengagement with means on said compartment effective when engaged to hold said lid in compartment closing position, a clock detachably mounted on the upper face of said last named portion of said lid with the back of said clock faced toward said lid, means on said lid holding said clock spaced from said lid, mechanism in said clock for disengaging said bolt from said means on said compartment at a pre-selected time including an operating spring, a winding key projecting from the back of said clock and an arming element, and a member carried by said bolt and disposed in the path of rotation of said winding key incident to activation of said clock mechanism effective to cause said rotation of said key to move said bolt to disengaged position, said clock additionally serving as part of a counterweight means effective upon disengagement of said bolt from said means on said compartment to move said lid to open position; said means for holding said clock on said lid including means engaging said arming element and effective to prevent mounting of said clock on said lid without positioning said arming element to effect release of said bolt actuating mechanism at a preselected time.

4. A feeding device for dispensing food to domestic pets at a pre-selected time including in combination a food compartment having an open top, a lid hingedly connected to the upper edge of said compartment and including a compartment closing portion and another portion extending from said hinged mounting in the opposite rearward direction from said compartment closing portion, a bolt slidably mounted on said lid for engagement and disengagement with means on said compartment effective when engaged to hold said lid in compartment closing position, a clock detachably mounted on the upper face of said last named portion of said lid with the back of said clock faced toward said lid, means on said lid holding said clock spaced from said lid, mechanism in said clock for disengaging said bolt from said means on said compartment at a pre-selected time including an operating spring, a winding key projecting from the back of said clock and an arming element, and a member carried by said bolt and disposed in the path of rotation of said winding key incident to activation of said clock mechanism effective to cause said rotation of said key to move said bolt to disengaged position, said clock additionally serving as part of a counterweight means effective upon disengagement of said bolt from said means on said compartment to move said lid to open position; and yielding friction applying means engageable with the rear extremity of the said lid during movement thereof to said compartment open position from said compartment closed position effective to apply braking action to the said lid during said movement with resultant stoppage of said lid in a near vertical position without damaging shock to the walls, floor and feeder parts.

References Cited in the file of this patent

UNITED STATES PATENTS

| 1,487,599 | Potter | Mar. 18, 1924 |
| 2,157,682 | Sweeny | May 9, 1939 |
| 2,677,350 | Prestidge et al. | May 4, 1954 |